March 8, 1927.  1,620,308
W. WESTBURY ET AL
MANUFACTURE OF GLASS ARTICLES
Original Filed May 20, 1924  2 Sheets-Sheet 2
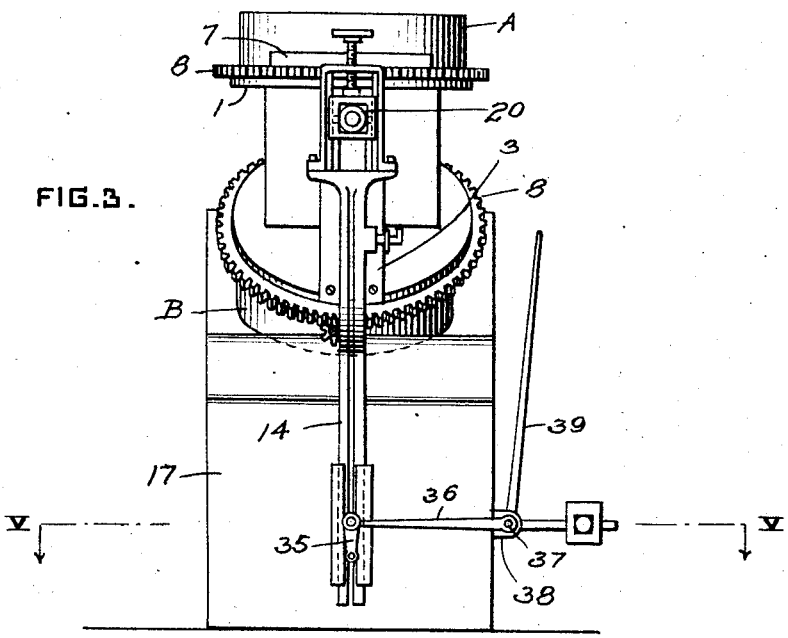
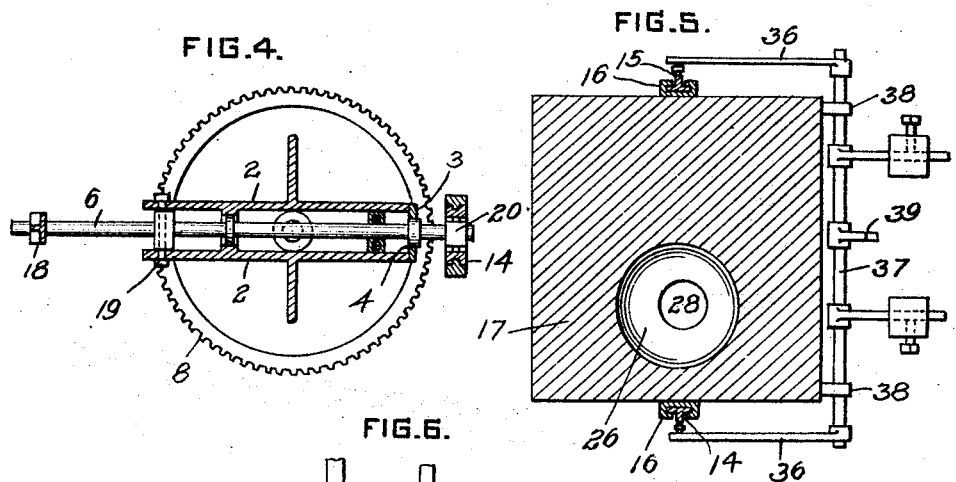
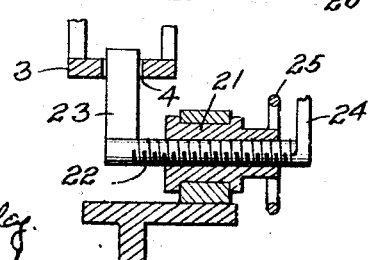

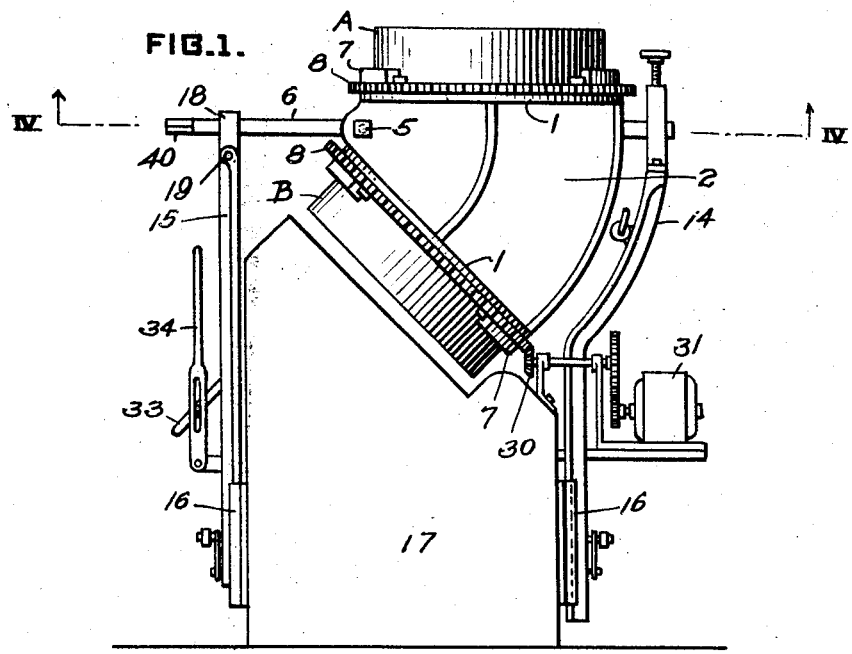
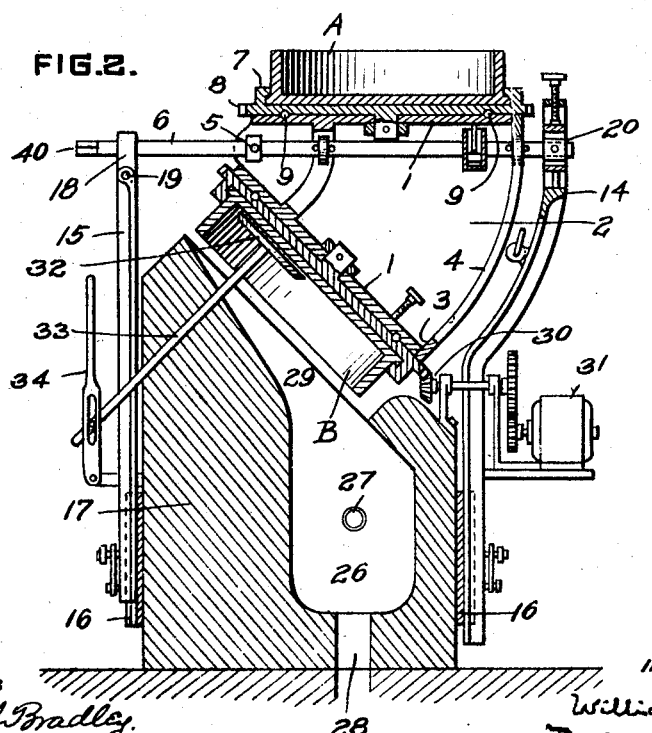

Patented Mar. 8, 1927.

1,620,308

UNITED STATES PATENT OFFICE.

WILLIAM WESTBURY, OF CANASTOTA, AND PATRICK W. COLLINS, OF ELMIRA, NEW YORK.

MANUFACTURE OF GLASS ARTICLES.

Original application filed May 20, 1924, Serial No. 714,680. Divided and this application filed January 21, 1926. Serial No. 82,879.

This application is a division of our prior application Serial No. 714,680, filed by us on May 20th, 1924, and the present invention consists in a new method which can be practiced advantageously in connection with the operation of the mechanism therein shown and described.

In the drawing of glass cylinders one of the great difficulties has been that of securing and maintaining uniformity of thermal conditions at and surrounding the base or meniscus of the cylinder being drawn. It is well known that irregularities in temperature in different parts of the bath of molten glass at and near the surface, as well as in different parts of the wall of the pot, or other containing receptacle, are in large degree the cause of what is known as thick-and-thin glass, namely, glass of uneven thickness circumferentially of the cylinder. Many efforts have been and are being made to obtain substantial thermal uniformity, but in what is generally considered to be the best factory practice at the present time, various means are employed for shifting the point of draw, as it is termed, and thus endeavoring to counteract the harmful effects of thermal irregularities as they occur. It is not intended in the practice of the present invention to exclude, or altogether do away with, the employment of such compensating devices or practices, if considered desirable. But it is believed that by the present invention a close approximation to absolute thermal uniformity in the glass bath is obtained, and that with reasonable factory precautions glass cylinders of uniform thickness circumferentially can be produced without resort to any of the compensatory measures referred to above.

Another advantage derived from the practice of the invention is that in the remelting operation the pot is effectively drained of small nodules and other refuse glass, and a smooth, clean surface is obtained for the reception of the next charge of fresh molten glass, thus materially contributing to the production of glass of high quality.

In the accompanying drawings we have shown the apparatus of the above mentioned joint application, having means suitable for the practice of the present invention. Figure 1 is a view in side elevation of a two-pot apparatus arranged above and in combination with a remelting or pot-draining furnace. Figure 2 is a front-to-rear central sectional elevation. Figure 3 is a front elevation. Figure 4 is a cross-section on the line IV—IV of Figure 1, looking upwardly. Figure 5 is a cross-section on the line V—V of Figure 3, looking downwardly. Figure 6 is a detail section through a lock for the pots.

The two pots A and B are mounted back to back at an acute angle to each other on a pair of plates 1, 1, connected together by sector-shaped bars 2, 2, and the face-plate 3 having the longitudinal slot 4, the whole constituting a hollow pot-carrying frame. At the rear or apex end of the sector-shaped frame the bars 2, 2 are pivotally connected at 5 to the horizontal shaft 6 which passes through the frame and is rotatably mounted in bearings at its opposite ends, as will be described presently. Each pot is detachably clamped in the usual or any suitable way in a head 7, rotatably mounted upon its bearing plate 1, and provided with gear-teeth 8 around its periphery. Ball bearings 9 may be provided between the heads 7 and the plates 1, 1.

The shaft 6 is mounted in bearings carried at the top of uprights 14 and 15, the lower ends of which are slidably mounted in guides 16 disposed upon the front and back walls of the furnace 17, and supported by means to be described presently. If it should be desired to provide for shifting the point of draw, as it is termed, front to rear tilting of the pot may be obtained by pivotally mounting the rear bearing 18 of the shaft 6 upon the upright 15, as at 19, and by making the front bearing 20 vertically adjustable in the upright 14. Tilting of the pot sidewise may be done through the lock shown in Figure 6. Mounted on the upright 14 is an internally-threaded sleeve 21, in which is a threaded shaft 22, carrying at its inner end a lug or projection 23, and at its outer end an operating handle 24, so that by turning the shaft 22, the projection 23 is caused to engage the slot 4 in the front face of the pot-carrying frame and thus lock the frame in operative position. The sleeve 21 itself is capable of rotation, but is held against endwise movement and is provided with a hand-wheel 25. When the lug 23 is in locking position in the slot 4, the frame as a whole may be tilted from side to side by turning the handwheel 25 and the sleeve 21.

The remelting furnace 17 has a combustion chamber 26 supplied with fuel by burner pipes 27, with a discharge opening 28 for the waste glass. Above the combustion chamber is a sloping wall or roof at substantially the same angle to the horizontal as that of the inverted pot in draining position, having an opening 29 through which the heat from the combustion chamber flows into the pot immediately above to remelt the aftermath or refuse glass and cause it to drain out of the pot by gravity.

The present invention resides essentially in turning the pot about its axis during the remelting and draining operation. In the operation of the mechanism shown in the drawings this is accomplished by the bevel pinion 30 driven by the motor 31, which meshes with the peripheral teeth 8 of the head 7 of the inverted pot, as shown in Figures 1 and 2. This turning of the pot may be a continuous rotation throughout the remelting operation, as is usually the more desirable, or it may be partial, or intermittent, or the direction of the turning may be reversed if desired. In this way all the refuse glass may be completely remelted and caused to drain out of the pot, and this is most effectively accomplished with the inverted pot supported at an angle less than a right angle to the horizontal, when the force of gravity will operate continually upon the glass in every part of the pot. After a few draws the interior surfaces of the pots become coated with a smooth and uniform glaze, free from all nodules and loose particles of glass likely to injure the quality of the product. It is also a result of great importance that by the turning of the pot during the melting out of the aftermath the walls and floor of the pot become uniformly heated for the next filling and drawing, so that the danger of thermal irregularity during drawing is minimized.

An additional feature of the present invention is the scraping of the surface of the interior of the pot, or portions of it, if desired, during the remelting operation. Figure 2 of the drawings shows the scraping of the floor of the pot. As there shown, the scraping tool 32 is carried on the end of a rod 33 projecting through an opening in the furnace wall and connected to an arm 34 by means of which the tool may be held against the floor of the rotating pot. When not in use, the tool may be drawn back and rest against the inner wall of the furnace.

In the machine shown in the drawings the uprights 14 and 15 are connected at their lower ends, by links 35 and arms 36 to the rock-shaft 37 mounted in bearings 38 upon the side wall of the furnace. A hand lever 39 is fixed to the shaft. By this means, when the shaft 6 and the pots have been turned, the whole structure is lowered slightly to bring the inverted pot close to the furnace-opening 29 and cause its teeth 8 to mesh with the bevel pinion 30. At the end of the operation the pot structure will be raised slightly again before turning.

The entire operation will be understood by those skilled in the art. Any suitable lever arm may be attached to the rear end 40 of the shaft 6. With the pots in the position shown in Figures 1 and 2, molten glass is ladled into the pot A. The glass cylinder is then drawn and is severed from the residue of glass remaining in the pot. The shaft 6 is then turned and the pot A is brought to the lower inverted position, with its gear teeth 8 meshing with the bevel pinion 30. The drawing of another cylinder from the pot B then takes place, and during that operation the residue of glass is being remelted and drained from the inverted pot A while that pot is being turned, as described, so that the residue of glass is completely drained out by the action of gravity, and the pot is evenly reheated for the next draw.

While we have described our invention as carried out in remelting the glass with the pot in an inverted inclined position, which is believed to be the best practice, the invention is not limited in that respect. For example, the glass may be remelted and drained from the pot supported with its floor at a right angle to the horizontal, or the pot may be in any other desired position. Also, as will be understood, the invention is not limited with respect to the apparatus employed.

We claim as our invention:

1. The method of manufacture of glass articles, which consists in supplying molten glass to a pot, drawing and severing the article therefrom, then reheating and discharging the glass residue, and axially turning the pot during the reheating operation.

2. The method of manufacture of glass articles, which consists in supplying molten glass to a pot, drawing and severing the article therefrom, then reheating and discharging the glass residue, and axially turning and scraping the pot during the reheating operation.

3. The method of manufacture of glass articles, which consists in supplying molten glass to a pot, drawing and severing the article therefrom, then turning the pot into position for draining by gravity, reheating and draining the glass residue, and axially turning the pot during the reheating operation.

4. The method of manufacture of glass articles, which consists in supplying molten glass to a pot, drawing and severing the article therefrom, then inverting the pot and reheating the glass residue, and axially turning the pot during the reheating operation.

5. The method of manufacture of glass articles, which consist in supplying molten glass to a pot, drawing and severing the article therefrom, then turning the pot into inverted inclined position, reheating and draining the glass residue, and axially turning the pot during the reheating operation.

In testimony whereof we have hereunto set our hands.

WILLIAM WESTBURY.
PATRICK W. COLLINS.